(12) United States Patent
Haspel

(10) Patent No.: US 7,261,504 B2
(45) Date of Patent: Aug. 28, 2007

(54) FASTENING DEVICE FOR A VEHICLE AREA

(75) Inventor: Klaus Haspel, Rottenburg (DE)

(73) Assignee: Bos GmbH & Co. KG, Ostfildern (DE)

( * ) Notice: Subject to any disclaimer, the term of this patent is extended or adjusted under 35 U.S.C. 154(b) by 0 days.

(21) Appl. No.: 11/437,221

(22) Filed: May 19, 2006

(65) Prior Publication Data

US 2006/0210372 A1    Sep. 21, 2006

Related U.S. Application Data

(62) Division of application No. 10/840,567, filed on May 6, 2004, now Pat. No. 7,097,401.

(30) Foreign Application Priority Data

May 7, 2003    (DE) .................... 103 21 890

(51) Int. Cl.
    B61D 45/00    (2006.01)
(52) U.S. Cl. .................................. 410/101
(58) Field of Classification Search ............. 410/97, 410/99–101, 103–104, 106–107, 111–112, 410/116; 224/324
    See application file for complete search history.

(56) References Cited

U.S. PATENT DOCUMENTS

| | | | |
|---|---|---|---|
| 2,605,064 A | 7/1952 | Davis | |
| 2,625,118 A | 1/1953 | Lechner | |
| 3,877,671 A | 4/1975 | Underwood et al. | |
| 3,972,500 A | 8/1976 | Johnson et al. | |
| 4,102,274 A | 7/1978 | Feary et al. | |
| 4,431,123 A | 2/1984 | Bott | |
| 4,432,478 A | 2/1984 | Bott | |
| 4,475,701 A * | 10/1984 | Martin | 244/118.6 |
| 4,616,771 A | 10/1986 | Heideman | |
| 4,717,298 A | 1/1988 | Bott | |
| 4,811,877 A | 3/1989 | Heideman | |
| 4,936,527 A | 6/1990 | Gorges | |
| 4,955,771 A | 9/1990 | Bott | |
| 4,972,983 A | 11/1990 | Bott | |
| 5,120,910 A * | 6/1992 | Bruning | 191/22 DM |
| 5,137,403 A | 8/1992 | McCaffrey | |
| 5,178,346 A | 1/1993 | Beroth | |
| 5,378,094 A | 1/1995 | Martin et al. | |
| 5,823,724 A | 10/1998 | Lee | |
| 6,219,983 B1 | 4/2001 | Graekjaar Jensen et al. | |
| 6,514,021 B2 | 2/2003 | Delay | |
| 6,712,568 B2 | 3/2004 | Snyder et al. | |
| 6,899,366 B2 | 5/2005 | Krueger et al. | |
| 2003/0184107 A1 | 10/2003 | Hapspel et al. | |
| 2005/0214093 A1 | 9/2005 | Priesgen | |

FOREIGN PATENT DOCUMENTS

| | | |
|---|---|---|
| DE | 198 03 210 A1 | 8/1999 |
| DE | 199 30 763 A1 | 2/2001 |
| DE | 199 41 714 A1 | 3/2001 |
| DE | 100 47 542 A1 | 1/2002 |

* cited by examiner

Primary Examiner—H Gutman
(74) Attorney, Agent, or Firm—Flynn, Thiel, Boutell & Tanis, P.C.

(57) ABSTRACT

A fastening device for a vehicle area with at least one reception rail fixed to the vehicle has associated therewith an additional functional profile. The additional functional profile permits the binding of further components to the reception rail. In one embodiment, the functional profile includes a plastic envelope profile surrounding the reception rail. In a further embodiment, a fastening block is placed in the reception rail, and can be secured in the reception rail.

1 Claim, 5 Drawing Sheets

FASTENING DEVICE FOR A VEHICLE AREA

CROSS REFERENCE TO RELATED APPLICATIONS

This application is a divisional application of U.S. Ser. No. 10/840 567, filed May 6, 2004 now U.S. Pat. No. 7,097,401.

BACKGROUND OF THE INVENTION

1. Field of the Invention

The invention relates to a fastening device for a vehicle area with at least one vehicle-fixed reception rail.

2. Description of Related Art

Such a fastening device is generally known in connection with cars. Thus, in particular vehicle seats in the vehicle interior are located in displaceable manner on reception rails. The reception rails are connected to a vehicle floor and are consequently fixed to the vehicle.

It is also known (DE 100 47 542 A1) to anchor several reception rails in a loading or luggage area or space of a car and said rails can be used for receiving and fixing functional components.

The problem of the invention is to provide a fastening device of the aforementioned type, which, with simple means, has high functionality.

BRIEF SUMMARY OF THE INVENTION

This problem is solved in that with the reception rail is associated at least one additional functional profile, which at least approximately corresponds to a reception rail length and which over at least a part engages flat on the reception rail. The part is constituted by at least one longitudinal edge surface of the reception rail. Preferably the functional profile surrounds the reception rail over a part circumferential area. Preferably the at least one reception rail is located in the vicinity of a base or floor of a luggage area, which serves as the vehicle area. The luggage area can in the form of a trunk or boot be separated from the passenger area or can be integrated together with the passenger area into a vehicle interior. The luggage area can also be a commercial vehicle area. It is also possible to provide the at least one reception rail in a passenger compartment serving as a vehicle area. The additional functional profile can be detachably or undetachably connected to the reception rail. It can be placed positively, non-positively or integrally on the reception rail. It is also possible to merely associate spatially said additional functional profile with the reception rail, without there being a fixed and permanent link between the functional profile and the reception rail. The term spatial association is in particular understood to mean that the functional profile is in contact with the reception rail in at least part of the latter.

According to a development of the invention the functional profile is constituted by a top or cover profile, which is placed on an open side of the reception rail. This development is particularly advantageous if the at least one reception rail is countersunk in a luggage area floor and the top profile closes the open side of the reception rail preferably flush with the connecting luggage area floor.

According to a further development of the invention, the top profile is in the form of an angular fitted extension of a wall part of the vehicle area. This development is particularly advantageous if the at least one reception rail is located in a corner area of a luggage area. The top profile can then be located on a side wall part of the luggage area and preferably in its transition zone to a luggage area floor. Preferably the top profile is shaped in hinge-like manner on the wall part.

According to a further development of the invention, the functional profile is an envelope profile, particularly made from plastic surrounding the reception rail and on which is provided at least one functional geometry. A functional geometry can be in the form of a fastening profiling, but also in the form of differently designed functional or reception portions. The fastening profile can be a hinge-like articulation area, a linear guide along the envelope profile for the displaceable insertion or removal of a top element or some other functional element, or also a locking or plugging profiling for locking or plugging in the top or functional element.

According to a further development of the invention, the envelope profile has means for positive connection to the reception rail, which ensures a reliable, permanent connection to said rail. Functional areas of the envelope profile, such as in particular a fastening profiling, are consequently reliably connected to the reception rail and therefore to the vehicle. The means for the positive connection are in particular constituted by profilings, extensions or the like shaped in one piece on the envelope profile and which positively embrace at least part of the functional profile. Separate connecting means which temporarily secure the envelope profile to the reception rail are also known.

According to another development of the invention, the functional profile has a support moulding for supporting a luggage area floor portion. The support moulding consequently serves as a supporting function for an in particular frame-like or areal part of the luggage area floor.

In another development of the invention at least one fastening block is located in the reception rail in displaceable manner which is detachably securable in the reception rail by blocking means. This makes it possible to use the reception rail as a fastening rail for the variable fastening of different parts. The fastening block is provided with at least one reception or binding area, to which can be detachably secured a fastening means of a functional part to be anchored in the vehicle area. Preferably the fastening block at least substantially fills the free cross-section of the reception rail, so that in the case of a C-shaped reception profile of the reception rail it is possible to obtain a positive retention of the fastening block in the reception rail. The fastening block can in particular be displaced in the reception rail in the manner of a slider. The fastening block can be secured in position in the reception rail by using positively or non-positively acting blocking means.

According to a further development of the invention, the fastening block has a flexible annular loop anchored therein and which is made from tearing-resistant material. The annular loop constitutes a reception or binding area for connecting the fastening block to a fastening means. The annular loop is preferably constituted by a fabric strip. Fastening hooks or similar fastening means can be bound to the annular loop and can be in the form of parts of tension means such as bands, cables, etc., or can be located on functional devices, which can be mounted on the vehicle side by connection to the annular loop.

According to a further development of the invention, the annular loop is connected to return means for transferring the annular loop into a rest position closely engaging on the fastening block. The return means is preferably an elastic tension means, particularly an elastic tension member, which is on the one hand connected to the annular loop and on the other to the fastening block. Preferably, in the rest position, the annular loop is flush with the fastening block. A differently designed close bearing surface is also possible.

According to a further development of the invention the blocking means are designed in manually detachable manner and are so positioned relative to the fastening profilings of the reception rail, that tensile loading of the annular loop reinforces a detent action of the blocking means relative to the fastening profilings. The blocking means are preferably constituted by detents, which are located on movable locking elements within the fastening block. The locking elements are movably mounted in such a way that with their detents they are drawn in the annular loop tension direction into the fastening profilings, preferably into locking receptacles of the reception rail, which increases the fastening or blocking action of the blocking means.

In another development of the invention the reception rail is provided with at least one support web for the bearing of an interior base or floor part. In this case the supporting function is directly brought about by a corresponding extension on the reception rail.

The problem of the invention is also solved in that the reception rail is detachably or undetachably connected to a body support structure, which ensures a stable anchoring of the reception rail.

In another development of the invention the reception rail is designed as a load-absorbing part of the body support structure. This provides a particularly crashproof anchoring of the reception rail on the body support structure, so that the reception rail is also able to reliably fix heavy loads in the vehicle without it being torn from its firm link with the body support structure. The reception rail is sufficiently dimensionally stable that in the case of tensile loading caused by vehicle impact loads it is not or is not significantly deformed. In addition, the connection of the reception rail to the body support structure is sufficiently load absorbing for the connection to the body support structure to be secured even in the case of corresponding tensile loads on the reception rail.

BRIEF DESCRIPTION OF THE SEVERAL VIEWS OF THE DRAWINGS

Further advantages and features of the invention can be gathered from the following description of preferred embodiments of the invention, the claims and the attached drawings, wherein show:

DETAILED DESCRIPTION OF THE INVENTION

Figure 1:
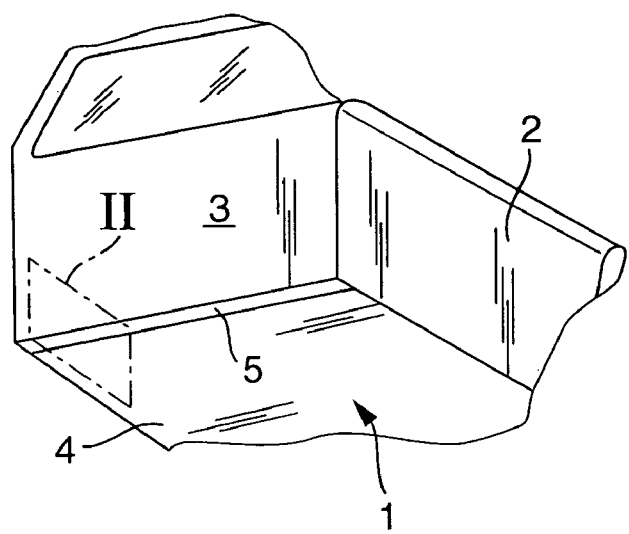
FIG. 1 Diagrammatically an extract from a luggage area of a motor vehicle with an embodiment of a fastening device according to the invention.

A motor vehicle in the form of a car has an interior in the rear of which is provided a luggage or loading area or space 1. In the embodiment according to FIG. 1 the luggage area 1 is open to the roof lining. In other embodiments of the invention the luggage area is in the form of a trunk, which is separated from the vehicle interior and bounded by a trunk cover. The luggage area 1 in the embodiment according to FIG. 1 is forwardly bounded in the vehicle longitudinal direction by a rear seat back arrangement 2. Towards the facing vehicle sides the luggage area 1 is in each case enclosed by a side wall 3, which is provided with a window cutout above a not further designated vehicle edge. The luggage area 1 has a planar base or floor 4.

The side wall 3 forms a covering or lining part, which level with the luggage area floor 4 has its lower edge supported in vehicle-fixed manner in a support profile 8 serving as a functional profile. The support profile 8 is preferably made from plastic. It is also possible to make the support profile 8 from metal and use an extrusion process. The support profile 8 is placed on a reception rail 6, which is welded to a body support structure 7, preferably to supporting parts of a body floor. The reception rail 6 is oriented in the vehicle longitudinal direction in the luggage area 1 and extends over virtually the entire length of said area 1. In not shown manner, a further reception rail fixed to the body support structure is provided on the other side wall 3 at the transition to the luggage area floor 4 on the facing luggage area side.

Figure 2:
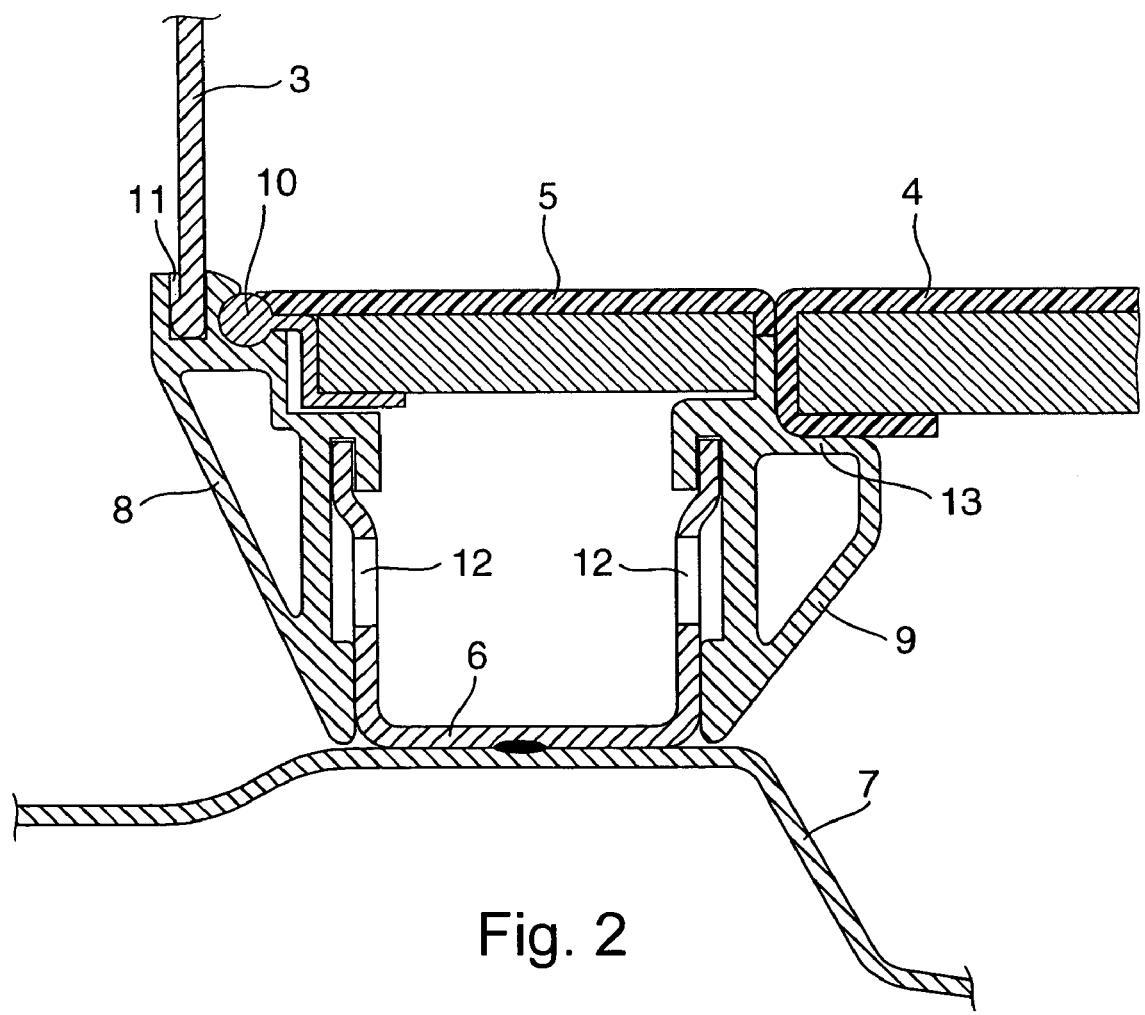
FIG. 2 A larger scale sectional view of the fastening device for the luggage area of FIG. 1 in sectional zone II of FIG. 1.

The reception rail 6 is designed as an upwardly open hollow profile and has an approximately U-shaped cross-section. The upper edges of the reception rail 6 are in each case bent laterally outwards, so that fastening profilings in the form of support profile 8 and a further support profile 9 can be engaged from above on the reception rail 6 without the plugging portions of the support profiles 8, 9 restricting the free cross-section of the reception rail 6. It is consequently possible to insert in the reception rail from above one or more fastening blocks 21 (FIGS. 5 to 8). Both support profiles 8, 9 engage from the outside flat on lateral legs of the reception rail 6 and are in each case in the form of hollow profiles. Both support profiles 8, 9 correspond to the length of the reception rail 6 and have in each case at least one additional function. The left-hand support profile 8 in FIG. 2 is provided on its top surface with a reception groove 11 for the insertion of the lining part for the side wall 3. The support profile 8 is also provided with a cylindrical reception groove in which is swivellably insertable a swivel hinge portion 10 of a top profile 5. The top profile 5 extends over the entire length of the reception rail 6 and covers the open side of the reception rail 6 in surface-flush manner with the luggage area floor 4. Both support profile 8 and support profile 9 are provided on their top surface with corresponding bearing edges for reliable positioning and supporting of the top profile 5 in its position closing the reception rail 6. The facing support profile 9 has a support shoulder 13 on which rests a base plate of the luggage area floor 4.

Figure 3:
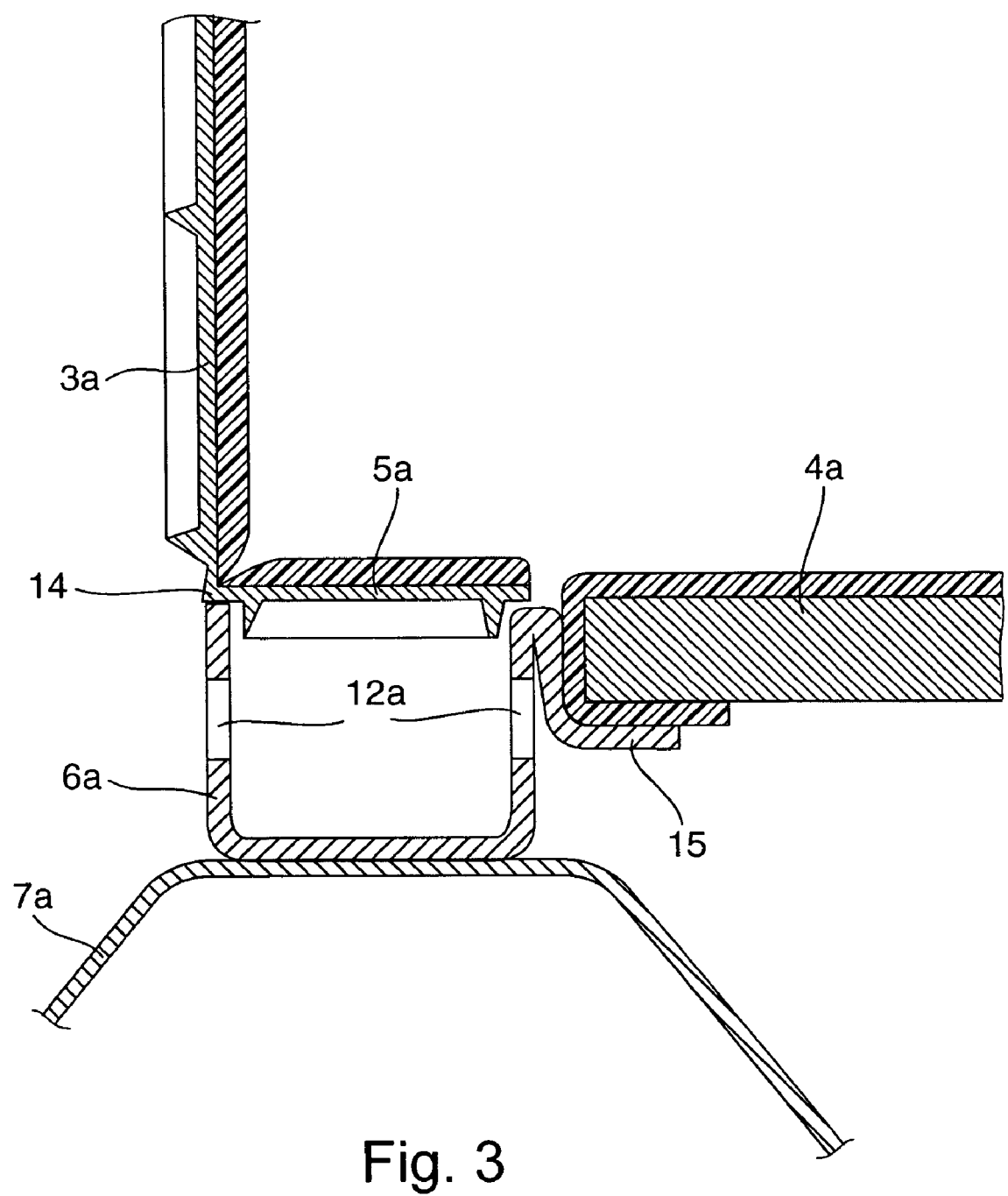
FIG. 3 A sectional representation of another embodiment of a fastening device similar to FIG. 2.

The embodiment according to FIG. 3 in many ways corresponds to that of FIGS. 1 and 2 and functionally identical components are given the same reference numerals, but to which the letter a has been added. The essential difference is that in this embodiment the side wall lining part 3a is in the form of a plastic part and projects upwards in vertical extension of one leg of the U-shaped reception rail 6a. The lower edge of the side wall lining part 3a rests on the upper edge of the corresponding leg of the reception rail 6a. The side wall lining part 3a is in the form of an areal or plate-like plastic component and is provided in the vicinity of its lower edge with a film hinge 14 by means of which the top profile 5a serving as a functional profile is shaped roughly at right angles on the side wall lining part 3a. The top profile 5a rests flat on the upper longitudinal edges of the two legs of the reception rail 6a and covers the open area of said rail. On its longitudinal side the top profile 5a is swivellably held by means of the film hinge 14, so that, as required, it can be flapped upwards towards the side wall lining part 3a in order to give access to the interior of the reception rail 6a.

In the vicinity of its leg facing the side wall lining part 3a, the reception rail 6a has as a support web a support shoulder 15, which is formed by the folding back of the preferably steel section reception rail 6a.

Figure 4:
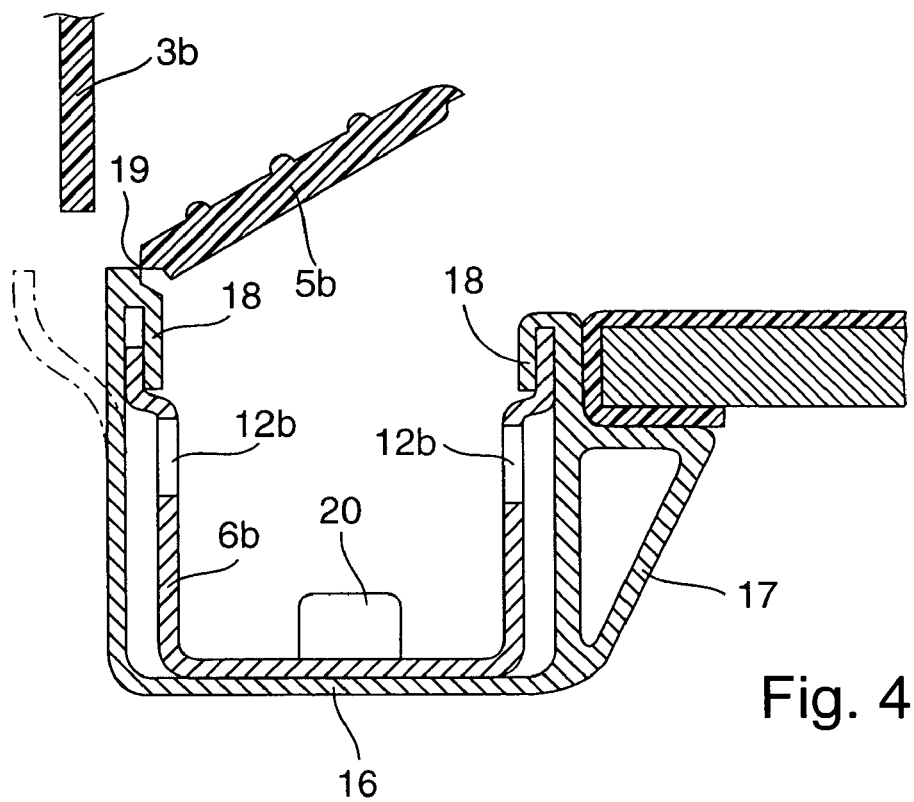
FIG. 4 A sectional representation of a further embodiment of a fastening device similar to FIGS. 2 or 3.
Figure 5:
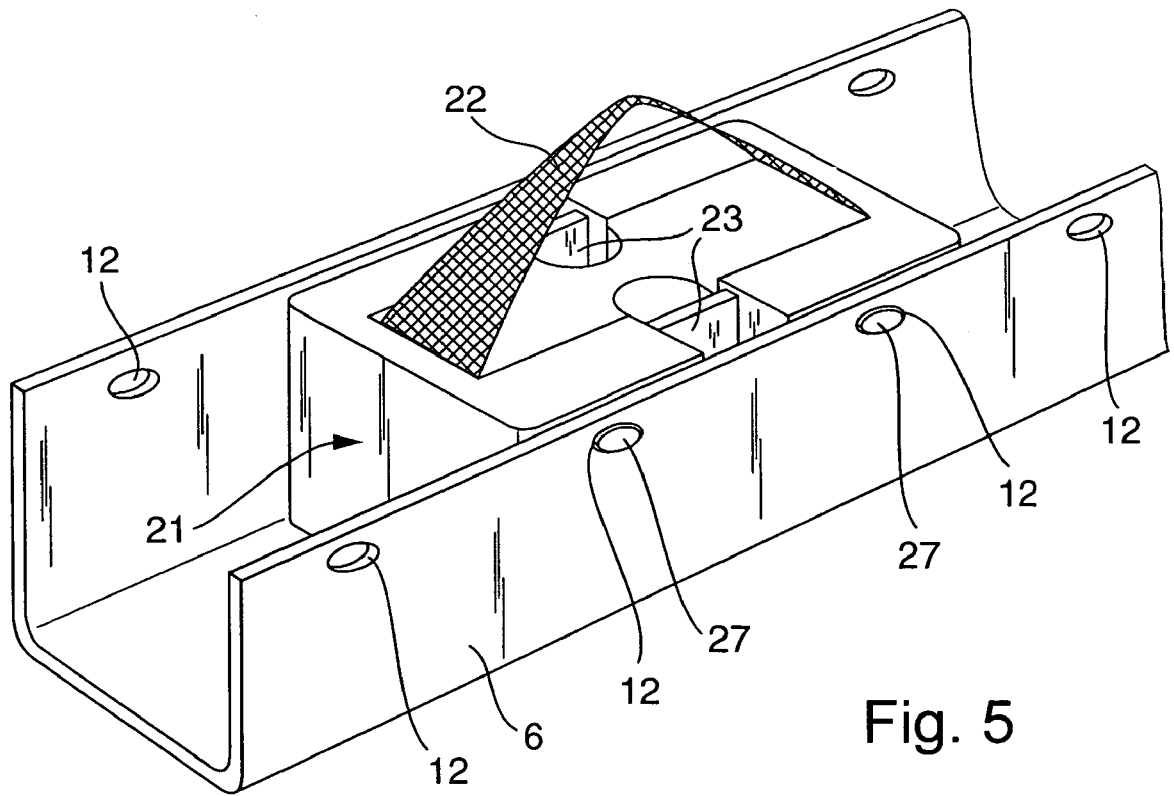
FIG. 5 A perspective view of a detail of a reception rail of a fastening device with a displaceable fastening block.

Also in the case of the fastening device according to FIG. 4 functionally identical parts are given the same reference numerals, but to which has been added the letter b. In this embodiment the reception rail 6b is surrounded by a plastic envelope profile 16. In much the same way as the support profiles 8 and 9, the envelope profile 16 has two web portions 18, which positively engage over the offset leg portions of the reception rail 6b. The envelope profile 16 is substantially U-shaped, like the reception rail 6b. In dot-dash line form is shown a support groove area, which can be shaped alternatively or additionally on the envelope profile 16 in order to receive the side wall lining part 3b, as in the embodiment according to FIG. 2. In the vicinity of the top of the envelope profile 16 a top profile 5b is integrally shaped on a leg thereof by means of a film hinge 19 and is swivellably mounted on the longitudinal side of the envelope profile 16. The top profile 5b closes the reception rail 6b flush with a luggage area floor. Onto the facing leg of the envelope profile 16 is shaped a support shoulder 17, which projects outwards at right angles and serves as a bearing surface for a luggage area floor part.

Each of the reception rails 6 to 6b according to FIGS. 2 to 4 is provided in the vicinity of the facing leg with in each case a row of uniformly mutually spaced recesses 12, 12a, 12b in the longitudinal direction of the reception rail 6 and which serve as locking receptacles for the positive reception of the detents 27 of a fastening block 21. The fastening block 21 (FIGS. 5 to 8) has a block-like body, whose height roughly corresponds to the vertical clearance of the reception rail 6 and whose width roughly corresponds to the inside width of the reception rail 6. The inside cross-section of the reception rail 6 and the cross-section of the fastening block 21 are so matched to one another that the fastening block 21 is longitudinally displaceable within the reception rail 6 for as long as it is not fixed in the locking recesses 12 by the subsequently further described blocking means. In each case two detents 27 on each side of the fastening block 21 are located on each case one locking jaw 24. The two locking jaws 24 are swivellably mounted about two parallel swivel or pivot pins 25 in a body of the fastening block 21. The two locking jaws 24 are arranged in mirror symmetrical manner to a vertical median longitudinal plane of the fastening block 21 and in each case slope upwards and outwards. On the top surface thereof, the two locking jaws 24 are in each case provided with a handle 23, which permits a manual swivelling of the locking jaws 24 by gripping the handles 23 from above. In the locking direction the two locking jaws 24 are subject to the action of a helper spring 26 in the form of a compression spring and which extends between the two jaws 24. In the position shown in FIG. 6 the two locking jaws 24 with their detents 27 are locked in the locking recesses of the reception rail 6. By simply inwardly pressing the two handles 23, the detents 27 are released from the locking recesses 12, so that the fastening block 21 can be displaced within the reception rail 6. Thus, as required, the fastening block 21 can be displaced along the reception rail 6 to 6b. After locking again the manual pressure on the handles 23 is in each case removed towards the centre, so that the detents 27 automatically lock in the next closest locking recesses 12, as soon as the fastening block 21 has reached the corresponding locking recesses during its linear displacement in the reception rail.

Figure 7:
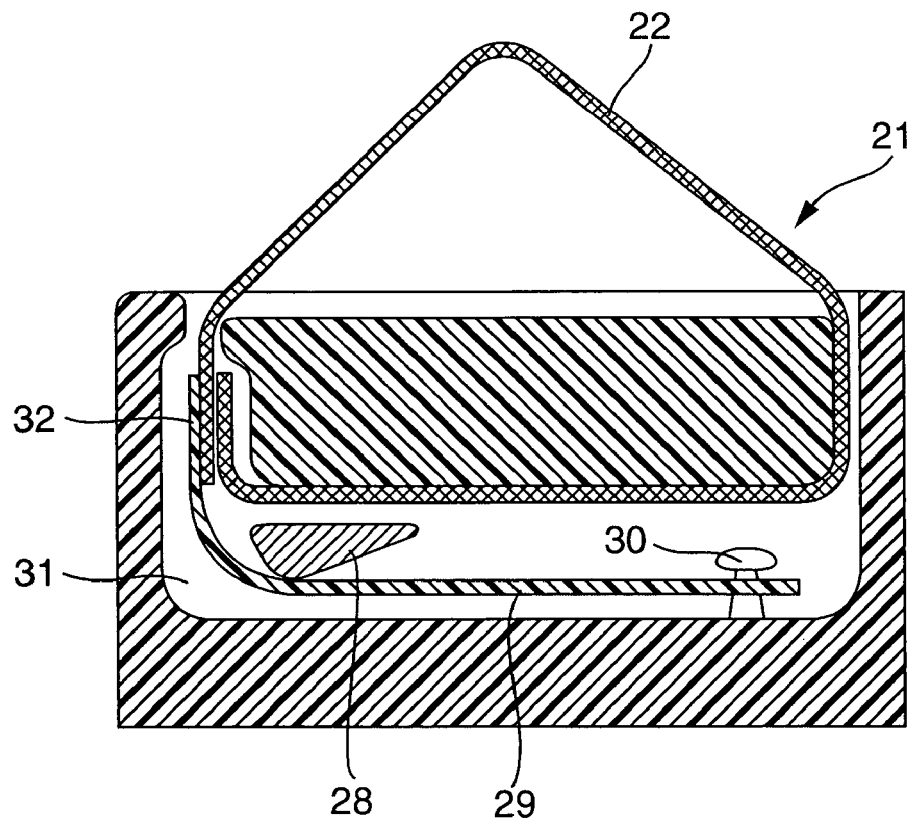
FIG. 7 On a larger scale and diagrammatically, a longitudinal section through a fastening block according to FIGS. 5 and 6 provided with an annular loop.
Figure 8:
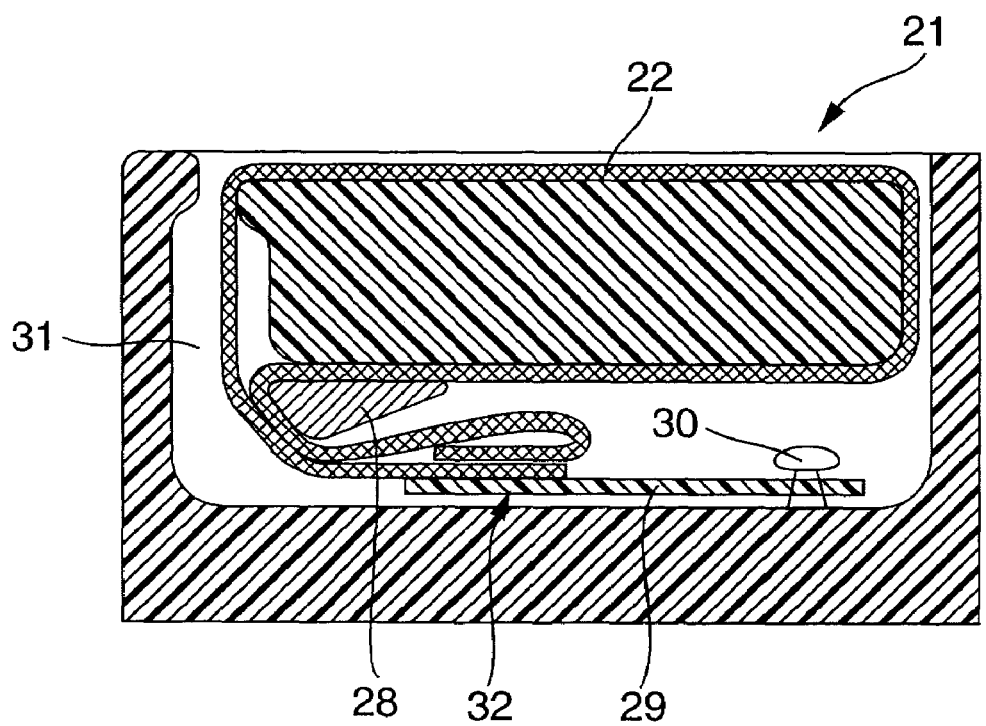
FIG. 8 The fastening block according to FIG. 7 with the fastening loop in its rest position.

In order to be able to secure fastening means to the fastening block 21, the fastening or binding area is constituted by a flexible annular loop 22, which is shown in FIG. 7 in its functional or operating position linked with not shown fastening means and in FIG. 8 in its countersunk rest position flush in the fastening block 21. The annular loop 22 loops a not shown block portion of the fastening block 21 with clearance in such a way that it is possible to extract an upper strand of the annular loop 22 upwards and beyond the surface of the fastening block 21 (cf. FIG. 7). The annular loop 22 is preferably in the form of a high strength fabric strip, connected by its facing front ends in overlapping manner to provide the ring shape. On said overlap area 32 engages an elastic tension means, here in the form of an elastic tension member 29. The tension member 29 is deflected about a fixed deflection portion 28, which is positioned in spaced manner below the block portion of the fastening block 21 and in the latter. With its one end region, the tension member 29 is firmly connected to the annular loop 22 in the overlap area 32 of the ends of the latter. A facing end of the tension member 29 is fastened to a retaining head 30, which is fixed in the fastening block 21. Below the block portion and below the deflection area 28 is provided a cavity 31, which serves as a storage area for the tension member 29 and lose loop areas of the annular loop 22 in its rest position.

As soon as an upward tensile load is exerted by fastening means on the annular loop 22, the latter is drawn upwards in accordance with FIG. 7 until its lower area firmly loops the block portion of the fastening block 21 and the tension strap 29 is drawn out into the taut position according to FIG. 7. When the tensile load on the annular loop 22 is removed, the elastic tensile force of the tension strap 29 draws the annular loop 22 back into the storage area 31 and the lose portions of the loop 22 are deflected round the deflection area 28. In the case of a further tensile loading on the annular loop 22 in the upwards direction, said loop 22 is again drawn out into the position according to FIG. 7.

Figure 9:
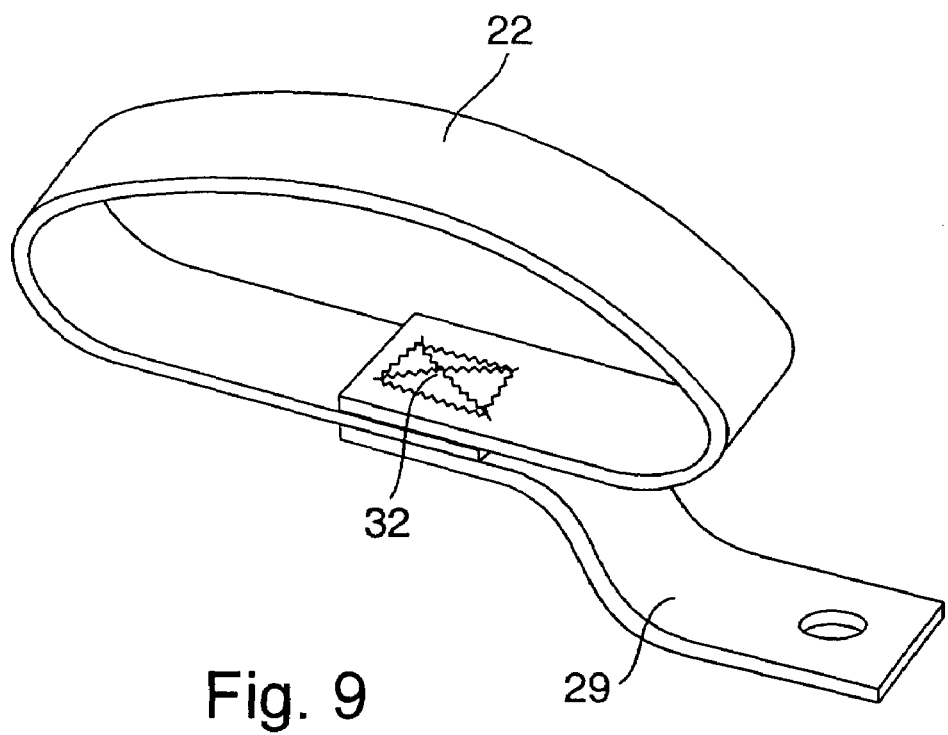
FIG. 9 A larger scale, perspective view of the annular loop for the fastening block of FIGS. 7 and 8.

FIG. 9 clearly shows the design of the annular loop 22 as a sewn fabric strip.

Figure 6:
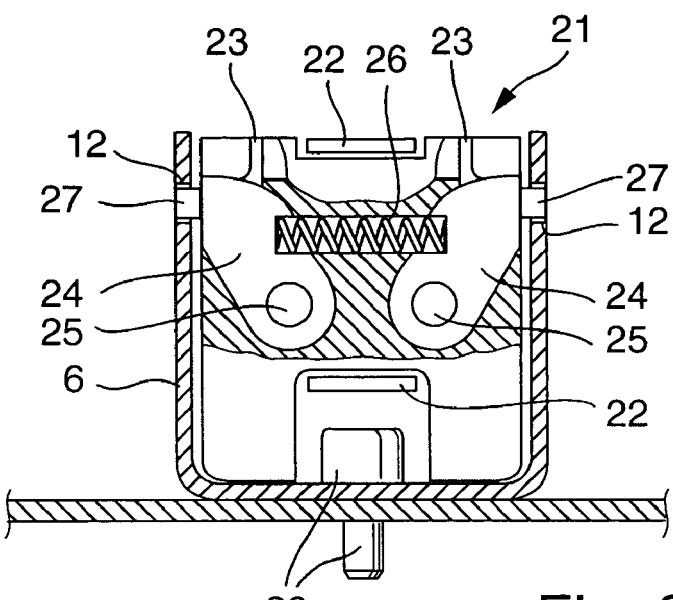
FIG. 6 A section through the reception rail with fastening block according to FIG. 5.

As it can be seen from FIGS. 4 and 6 the reception rail 6, 6b is detachably connected to the body support structure which is only shown in FIG. 6 and has no specific reference number. For the detachable connection to a supporting profile or part of the body support structure, especially to a length wise oriented supporting profile of the body support structure under the trunk floor, screws 20 are positioned in the corresponding reception rail and are mounted to the supporting profile or part. Through unscrewing of the screws 20 the reception rail 6, 6b can be released. The reception rails 6, 6b are designed and mounted to the supporting profiles or parts in such a way that they strengthen and reinforce the body support structure especially in the area of the trunk floor or luggage area floor.

What is claimed is:

1. A fastening device for a vehicle area with at least one vehicle-fixed reception rail, wherein at least one functional profile is associated with the reception rail, said at least one functional profile approximately corresponding to a length of the reception rail and at least a portion of which flatly engages on the reception rail, wherein a top profile is designed as an angular fitted extension of a wall part of the vehicle area, and wherein the top profile is shaped in hinge like manner on the wall part.

* * * * *